May 8, 1962 W. M. NELLIS 3,033,998

PULSE FORMER

Filed July 13, 1959

INVENTOR.

WILLIAM MERTON NELLIS

BY Carlson & Hoyle

ATTORNEYS 3,033,998

PULSE FORMER

William Merton Nellis, Maplewood, Minn., assignor to American Monarch Corporation, Minneapolis, Minn., a corporation of Minnesota Filed July 13, 1959, Ser. No. 826,854
2 Claims. (Cl. 307—88.5)

This invention relates to a bistable electrical circuit for forming an electrical impulse of a predetermined duration in response to a signal of shorter duration.

In digital systems it is often desirable for timing purposes to provide an electrical signal of a predetermined duration which is greater than the pulse width of the signals used in the system. Various types of pulse formers have been utilized to provide such a function including the well known monostable multivibrator in which one of the two non-linear discharge elements therein, such as a transistor, is biased to non-conduction or a high impedance state while the other element is biased to a highly conductive or a low impedance state. The circuit is responsive to an input signal of short duration to switch the conduction or impedance states for a predetermined time, after which the multivibrator automatically reswitches to the initial state. These devices when utilizing a minimum number of circuit components have a tendency to respond to supply voltage changes and noise as well as for a valid input signal. This sensitivity to extraneous electrical disturbances is in part caused by the coupling capacitor in the circuit storing electrical energy in the form of an electrical charge and one of the discharge elements drawing current through the circuit to provide power therein.

This invention obviates the above objections by providing a pulse former wherein both non-linear discharge elements are in high impedance state and both switch to a low impedance state for a predetermined time in response to an input signal of short duration. The circuit is insensitive to extraneous electrical disturbances and provides rapid impedance switching from both high to low and low to high impedance states.

Accordingly it is an object of this invention to provide a novel pulse former in which both discharge elements are in a normally high impedance state when the pulse duration determining elements are in a de-energized state.

It is another object of this invention to provide a novel pulse former in which both discharge elements are normally in a high impedance state and means are provided for rapidly discharging the pulse duration determining elements charged during a low impedance state after the discharge elements have reswitched to a high impedance state.

It is a further object of this invention to provide a pulse former having both discharge elements therein normally in a high impedance state and in which the formed pulse load is a part of the means rapidly discharging the pulse duration determining elements after the discharge elements have switched to a high impedance state.

It is still another object of this invention to provide a pulse former in which the pulse width determining elements are series connected in an electrical circuit loop having high gain for switching the impedance states of the discharge elements therein.

These and other more detailed and specific objects will be disclosed in the course of the following specification, reference being had to the accompanying drawing, in which—

Figure 1:
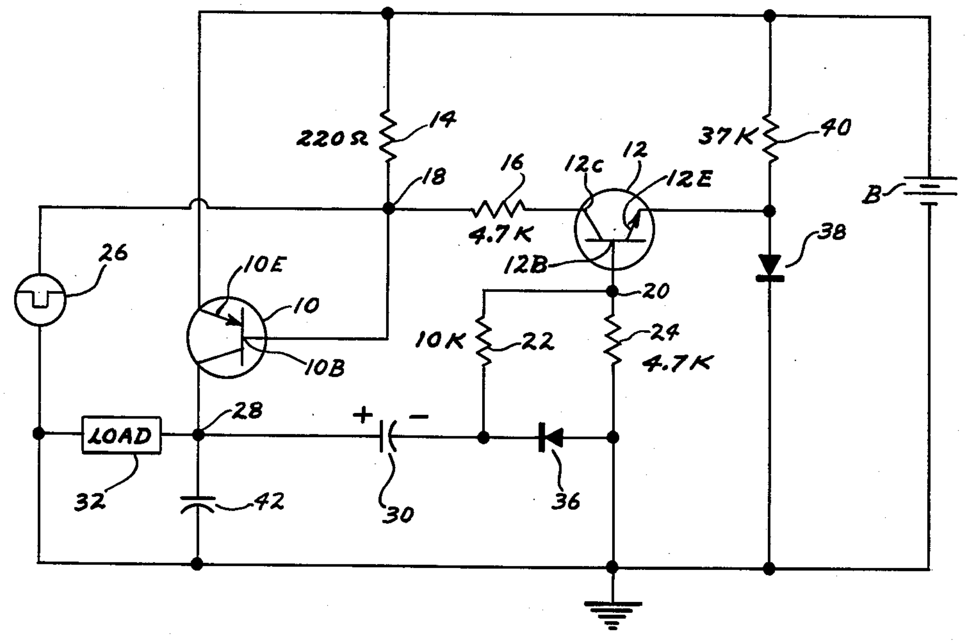
FIG. 1 is a schematic drawing of a circuit embodying this invention.

With reference now to the drawing complementary type transistors 10 and 12 are interconnected to form a bistable trigger circuit for forming a time limited pulse. Complementary type transistors are understood to indicate one transistor has a PN arranged emitter to base electrode forming semi-conductive material while the other transistor has a NP arranged emitter to base electrode forming material. With NPN transistor 12 in a high impedance state, i.e., at collector current cutoff, the PNP transistor 10 is also in a high impedance state. The current drive to base 10B is provided from the resistances 14 and 16 formed junction 18 as determined by the impedance state of discharge element 12. When element 12 is in a high impedance state it is apparent that the battery B voltage is essentially applied to base 10B as well as emitter or high current electrode 10E providing no current through the base electrode. Resistance 14 of small impedance is primarily provided to reduce the leakage current effect on the bistable circuit.

The base or control electrode 12B is connected to junction 20 between resistances 22 and 24 with resistance 22 being coupled to the transistor or discharge element 10 collector or high current electrode to complete a series connected bistable or latch circuit, as will become apparent. To switch the discharge elements 10 and 12 to a low impedance state a negative going signal 27 of short duration from the source 26 is applied to junction 18 and thus base 10B. The input pulse voltage is developed across resistance 14 to make base 10B negative with respect to emitter 10E. Base drive current flows through the base electrode 10B making the transistor or element 10 conductive or tending toward a low impedance state as measured between the collector and emitter high current electrodes.

The change in impedance of the element 10 causes the junction 28 voltage to become somewhat positive with respect to the initial voltage thereon. The voltage change is transferred through the timing capacitor 30 and resistance 22 to the base electrode 12B. The positive going transient voltage just described causes NPN transistor 12 to become slightly conductive tending toward a low impedance state which draws additional current through resistance 16 and thereby tending to make the voltage on junction 18 lower than the battery B voltage due to the voltage drop provided through resistance 14. It is seen that this action is cumulative and that both transistors will soon reach collector current saturation which is termed the low impedance state. Upon termination of the pulse 27 the voltage on junction 18 is shown as wave 31 and the circuit remains in the low impedance state providing voltage pulse 32A across the load 32 and having an amplitude near the battery voltage potential.

Figure 2:
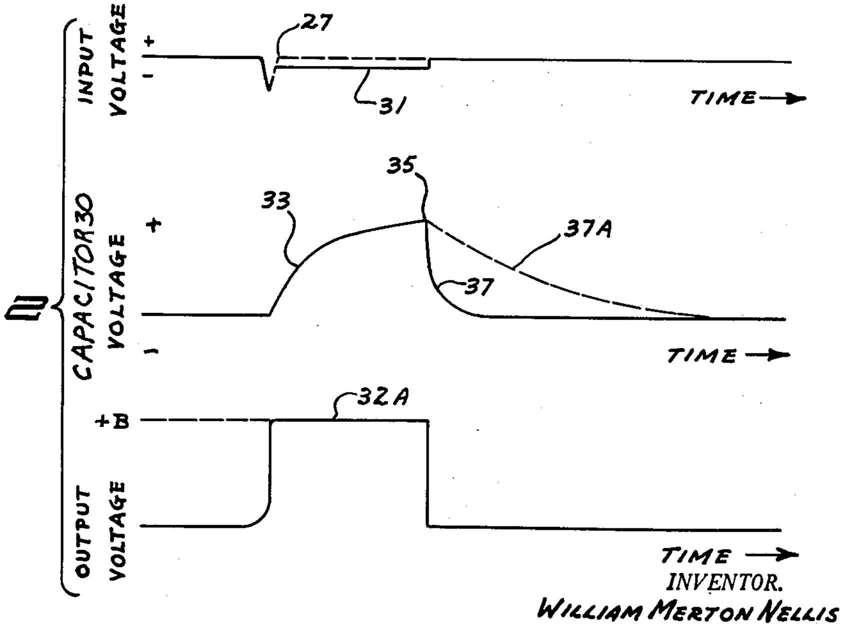
FIG. 2 illustrates typical wave forms associated with the FIG. 1 circuit.

It is seen that the base drive current for NPN transistor 12 is provided through transistor 10, thence timing capacitor 30 and resistance 22. This small current is operative to charge capacitor 30 while the circuit low impedance elements permit a substantial current to flow through a load 32 from the transistor 10 and battery B. The voltage across the timing capacitor 30 is shown by numeral 33 and when the capacitor is substantially charged as at 35 the base drive current for transistor 12 is decreased below the base current amplitude required for transistor 12 collector current saturation. This action reduces the current through the high current electrodes 12C and 12E and thus permits junction 18 voltage to move more positive to make transistor less conductive. The regenerative loop again provides cumulative impedance switching action in that the positive going transient at junction 18 increases the impedance of transistor 10 causing the voltage at 28 to become less positive further reducing the base drive current to the transistor 12. Since this switching action is very rapid and the capacitor 30 has a charge thereacross as indicated in FIG. 2, the voltage magnitude at junction 20 is driven negative with respect to ground reference potential. Resistance 24 actually has a voltage thereacross it which is effective to reverse bias the base 12B with respect to the emitter 12E. It is apparent that the high impedance state of the transistor 12 has been reached when this has occurred thereby forcing the transistor 10 to a like high impedance state providing a very sharp turn-off of pulse 32A.

The capacitor 30 must now discharge through the load impedance 32 and the series connected resistances 22 and 24. Since this series circuit loop is a relatively high impedance the discharge time may be greater than the duration of the formed pulse 32A across the load 32. The repetitive frequency at which the circuit can provide the desired pulses is in such a case limited by the discharge time of the capacitor 30.

To increase the repetitive frequency of operation a uni-directional conducting device or diode 36 is connected in parallel with the resistances 22 and 24 with its cathode electrode connected to the capacitor 30 to provide a lowered impedance discharge path for the capacitor rapidly placing the capacitor in a discharged state. It is seen that with the two discharge elements in a high impedance state the voltage across the capacitor 30 urges electrical current to flow through load 32 and thence through diode 36 in the forward direction with the load 32 absorbing most of the electric charge. Since the load 32 is preferably of low impedance, for example about 1000 ohms, the discharge time for the capacitor 30 is greatly reduced as indicated by trailing edge 37 rather than the previous discharge voltage wave 37A through the high impedance resistances 22 and 24.

When the circuit is in the low impedance state it is seen the base drive current through resistance 22 causes a voltage drop thereacross to reverse bias the diode 36 to current cutoff and thus effectively remove it from the circuit.

To aid in rapid turnoff a silicon diode or uni-directional current conducting device 38 with a small forward impedance is connected in the forward current conducting direction between emitter electrode 12E and the battery B negative or grounded terminal. Resistance 40 connected to the battery positive terminal provides a bias current through diode 38 making the emitter 12E at all times slightly positive with respect to ground potential. This feature not only aids in driving the transistor 12 to a high impedance state but adds to the insensitivity of the circuit to extraneous electrical disturbances. Further circuit insensitivity to the disturbances may be provided by adding a filter capacitor 42 between the transistor 10 collector electrode and ground. Since the filter 42 has a much larger capacitive value than timing capacitor 30, it is ineffective to materially alter the circuit operation, except to absorb any extraneous electrical signals. Filter 42 is desirable when load 32 is a relay.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A pulse former comprising first and second transistors of complementary types, a supply voltage source having a grounded terminal and a second terminal connected to the emitter of the first transistor, a signal source for providing a pulse of short duration to the first transistor base for switching the circuit from a high to a low impedance state, a series connected capacitor and resistor connecting the first transistor collector and second transistor base together, a first resistor connecting the second transistor collector to the first transistor base, a second resistor of low impedance connected between the first transistor emitter and base, a third resistor connected between the grounded terminal and the second transistor base, an electrical load for receiving a formed pulse during the circuit low impedance state and connected between the first transistor collector and the grounded terminal, a first diode connected between the second transistor emitter and the grounded terminal in forward current conducting relation, a fourth resistor connected between the first transistor emitter and the second transistor emitter for providing a bias current through the first diode, and a second diode connected from the grounded terminal to between the series connected capacitor and resistor such that the diode is biased to current cutoff when the circuit is in a low impedance state and provides a low impedance discharge path including the load for the capacitor when the circuit is in a high impedance state.

2. A circuit as in claim 1 and further including a filter connected in parallel circuit to the load.

References Cited in the file of this patent

UNITED STATES PATENTS

| | | |
|---|---|---|
| 2,770,732 | Chong | Nov. 13, 1956 |
| 2,837,663 | Walz | June 3, 1958 |
| 2,877,360 | Moore | Mar. 10, 1959 |
| 2,927,268 | Haggai et al. | Mar. 1, 1960 |

OTHER REFERENCES

A publication put out by Sylvania Electric Products Inc., called "Sylvania Transistor News" (SD2–100M–559) date May 1959, relying on the "Blinker Light" circuit shown therein.